M. MOSER.
WASHER.
APPLICATION FILED FEB. 24, 1916.
1,208,620. Patented Dec. 12, 1916.
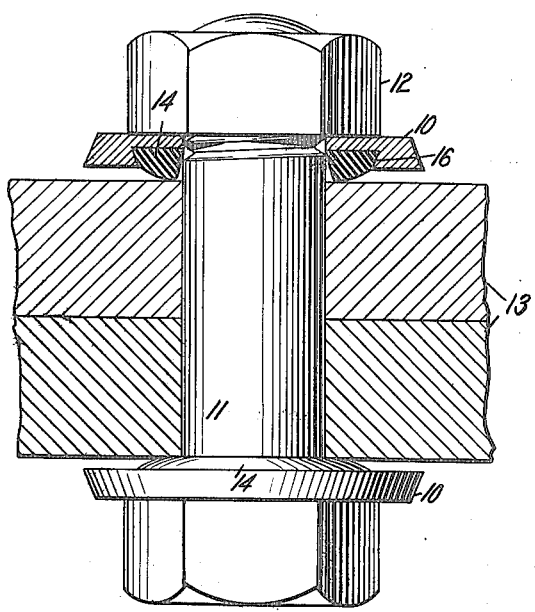
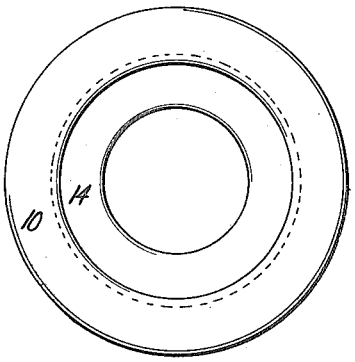
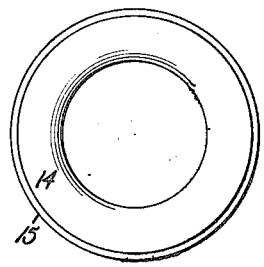
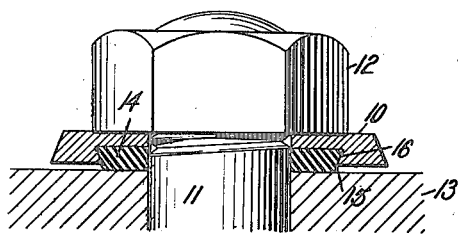
WITNESSES
INVENTOR
Milton Moser
BY
ATTORNEYS

UNITED STATES PATENT OFFICE.

MILTON MOSER, OF JUNEAU, TERRITORY OF ALASKA.

WASHER.

1,208,620. Specification of Letters Patent. Patented Dec. 12, 1916.

Application filed February 24, 1916. Serial No. 80,149.

*To all whom it may concern:*

Be it known that I, MILTON MOSER, a citizen of the United States, and a resident of Juneau, in the Territory of Alaska, have invented a new and Improved Washer, of which the following is a full, clear, and exact description.

My invention relates to a washer more particularly intended for use on bolts.

An object of the invention is to provide a washer with a resilient ring gasket carried thereby and so formed and so arranged on a face of the gasket as to extend to the opening in the washer, whereby to cause the tightening up of the nut on the bolt to compress the gasket against the opposed surface of the article being clamped and thereby constrict the gasket on the bolt to prevent rattling of the latter, and to cushion the same against shocks, as well as to assist in giving a better binding action of the washer against the nut.

The invention will be particularly explained in the specific description following.

Reference is to be had to the accompanying drawings forming a part of this specification in which similar reference characters indicate corresponding parts in all the views.

Figure 1 is a plan view, partly in section, of a bolt equipped with my improved washers, showing the same in use; Fig. 2 is a fragmentary view similar to Fig. 1, showing the result of tightening up the nut against the washer; Fig. 3 is a plan view of the complete washer; Fig. 4 is a plan view of the gasket.

In carrying out my invention in accordance with the illustrated example, a washer 10 is adapted to fit an ordinary bolt 11, having the usual nut 12, there being shown conventionally, in Fig. 1, two elements 13 clamped by said bolt. As shown, the washer may be employed both beneath the head of the bolt and beneath the nut 12 thereof.

My improved washer 10 has applied thereto, a resilient ring gasket 14, of rubber fiber or other material, and fitting in a depression 16 in a face of the washer. The said depression and gasket extend to the opening of the washer and in practice, the gasket may have an opening of slightly less diameter than the opening in the washer. The outer edge 15 of the gasket, preferably, is beveled and the depression 16 is undercut correspondingly, whereby the gasket will be firmly retained in position.

The gasket 14 is of a thickness to protrude annularly beyond the adjacent face of the washer 10, whereby the gasket will come to a bearing against the opposed surface of the adjacent member 13 when the nut 12 is tightened up. In the tightening of the nut the gasket will thus be constricted on the bolt 11 as indicated in Fig. 2, and will hug the same tightly. I prefer to flare the inner wall of the gasket as shown clearly in Fig. 1, the flaring being in an outward direction so that the threaded end of the bolt may be readily entered in the gasket and washer, and also, that the gasket will have a slight clinging action on the bolt to retain the washer in position.

By the use of my improved washer, all vibration and rattling of the bolt is arrested and also, the resiliency of the gasket tends to cause a better binding action between the opposed surfaces of the washer 10 and the nut 12.

Having thus described my invention I claim as new and desire to secure by Letters Patent:

A bolt washer having an undercut countersink in a face thereof and a resilient ring gasket carried thereby and embedded in said countersink, the said washer being flared at the periphery to correspond with the countersink and extending into the opening of the washer to come to a bearing and be compressed against the surface of an article to which the bolt is applied, and to constrict the opening of the gasket for binding action thereof against the bolt, the inner wall of the gasket being flared in an outward direction to initially present a restricted annular clinging contact with the bolt.

In testimony whereof I have signed my name to this specification in the presence of two subscribing witnesses.

MILTON MOSER.

Witnesses:
ANDREW MAGNESON,
R. E. ROBERTSON.